United States Patent [19]
Warner

[11] 4,195,774
[45] Apr. 1, 1980

[54] DUAL IN-LINE VALVE CONSTRUCTION

[75] Inventor: John L. Warner, Simsbury, Conn.

[73] Assignee: United Technologies Corporation, Hartford, Conn.

[21] Appl. No.: 1,037

[22] Filed: Jan. 4, 1979

[51] Int. Cl.² .......................................... G05D 23/13
[52] U.S. Cl. .................................. 236/13; 236/93 R; 137/220; 137/625.4; 137/625.49
[58] Field of Search ...................... 236/12 R, 12 A, 13, 236/93 R, 93 A, 95 J; 137/625.49, 219, 220, 625.4, 862, 625.26

[56] References Cited
U.S. PATENT DOCUMENTS

| | | | |
|---|---|---|---|
| 2,657,860 | 11/1953 | Schmidt | 236/12 R |
| 3,112,879 | 12/1963 | Killias | 236/12 R |
| 3,388,861 | 6/1968 | Harding | 236/12 R |
| 3,539,099 | 11/1970 | Grohe | 236/12 R |
| 3,561,483 | 2/1971 | Taplin | 236/12 A X |

Primary Examiner—Lloyd L. King
Assistant Examiner—William E. Tapolcai, Jr.
Attorney, Agent, or Firm—Donald F. Bradley; John D. Del Ponti

[57] ABSTRACT

Two fluid streams of different temperatures flow through two concentric pipes, the flow of each stream being modulated to achieve a desired mixture temperature. An in-line slide valve is interposed in one fluid flow path, and an in-line poppet valve is interposed in the other fluid flow path. A thermally responsive element is positioned downstream to sense the temperature of the mixed fluid stream, the element being connected via a rod to both the slide valve and the poppet. When the mixture temperature varies from a preselected temperature, the thermally responsive element moves the rod to gradually close the slide valve and open the poppet, or gradually close the poppet and open the slide valve, thereby changing the flow of both fluid streams and maintaining the desired mixture temperature.

3 Claims, 1 Drawing Figure

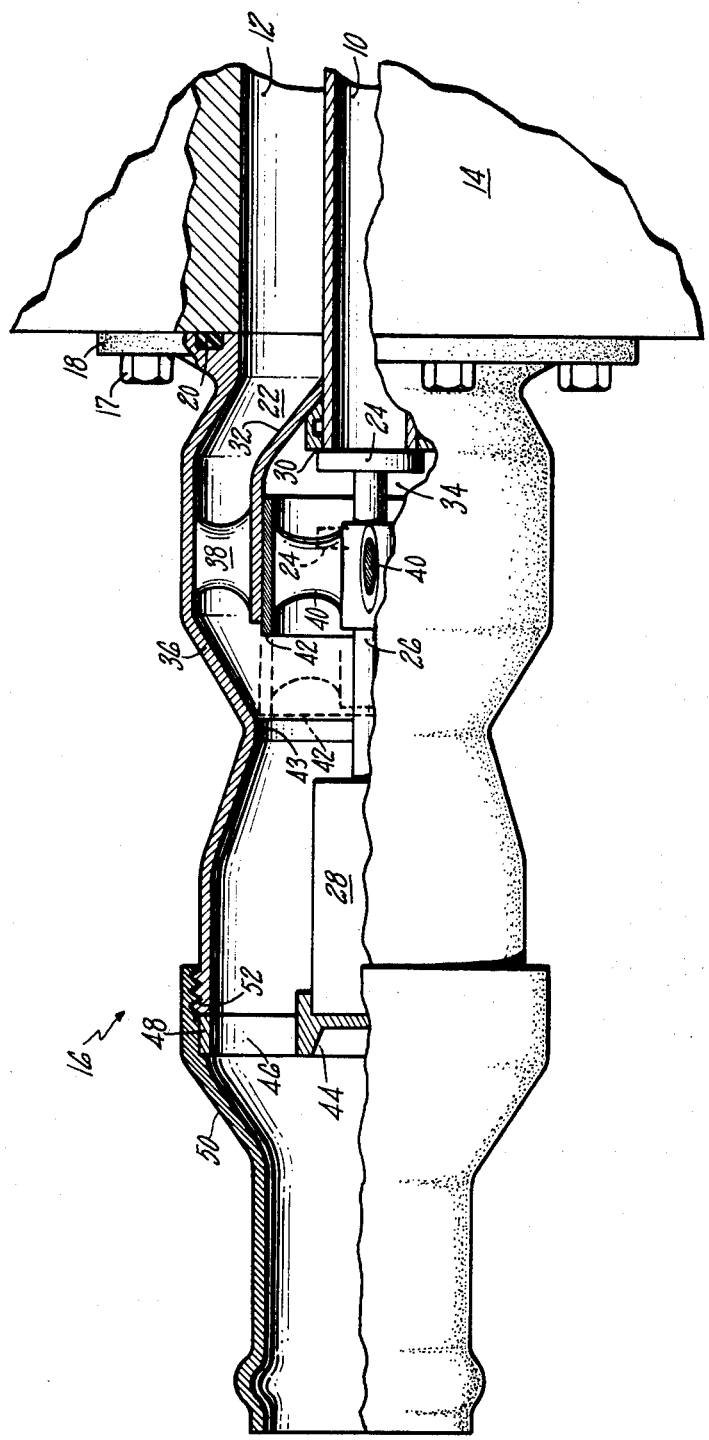

DUAL IN-LINE VALVE CONSTRUCTION

BACKGROUND OF THE INVENTION

1. Field of the Invention

This invention relates to a dual in-line valve construction for mixing two fluid streams in which one valve opens while the other closes. More particularly, this invention relates to a dual valve construction for simultaneously modulating the flow of two fluid streams of differing temperatures to achieve a desired mixture temperature. The valve construction provides a minimum restriction to flow in either of the two streams when the valve in the stream path is in its open position.

2. Description of the Prior Art

The prior art with respect to valves is quite extensive and includes numerous examples of dual valve constructions, some of which are thermally actuated. For example, West German Patent 723,024 relates generally to a thermally responsive valve which controls flow through a pair of coaxial ducts, but in a manner and with a construction which differs from the present invention. Likewise, dual valves located on a single shaft for flow control of fluids are also well known.

The present invention is an improvement over the prior art valve constructions in that it is a simple dual valve which provides mixing of two fluid streams while retaining a minimum pressure loss in each flow path. The object of the device is to modulate the flow of the two fluid streams simultaneously to achieve a desired temperature of the mixture of the two streams. By virtue of its construction, the dual valve provides a minimum restriction to flow in either of the two streams when that particular valve is in its fully open position. As a corollary, when both valves are partially open, the pressure loss in both paths is relatively minimal so as not to create an imbalance in the flow in one path relative to the other, except that created by either of the primary restrictions, and thereby produces a minimum restriction to the total flow.

The dual in-line valve of the present invention is particularly adapted for use in an environmental control system in which the two fluids are of different temperatures by virtue of the heating or cooling of one of the fluids upstream of the valve, the mixing of the two fluids being controlled to produce a desired temperature by simultaneously increasing the flow of one fluid while decreasing the flow of the other fluid.

It is therefore an object of this invention to provide a simple, inexpensive and efficient dual in-line valve.

Another object of this invention is a dual in-line valve for mixing two fluid streams while retaining a minimum pressure loss in each flow path.

A further object of this invention is a dual in-line valve for mixing two fluid streams to attain a desired mixture temperature.

Another object of this invention is a dual in-line valve in which a temperature sensor responds to the temperature of a fluid mixture and simultaneously opens one valve while closing the other to maintain a desired temperature.

A still further object of this invention is a dual in-line valve in which both valves are rigidly interconnected whereby one valve opens while the other closes.

Another object of this invention is a dual in-line valve which provides a minimum flow restriction when either of the valves is in its fully open position.

SUMMARY OF THE INVENTION

In accordance with the present invention there is provided a dual in-line valve in which fluid flow at two different temperatures enters the valve respectively through two concentric pipes. The flow of the inner pipe is regulated by a poppet attached to the end of an axially movable rod, while the flow of the outer pipe is regulated by the position of a slide valve, the movable portion of the slide valve being rigidly connected to the movable rod such that movement of the rod in one axial direction will close the poppet valve, reducing flow therethrough, while opening the slide valve, increasing flow therethrough. Conversely, movement of the rod in the opposite direction will open the poppet valve, increasing flow therethrough, while closing the slide valve, decreasing flow therethrough. A temperature sensor is located within the mixed flow path downstream from the two valves and responds to the temperature of the mixed fluid, any deviation of the temperature from a desired value being sensed by the sensor and causing movement, via an actuator, of the rod in a direction to open or close the valves and maintain the desired temperature. The temperature sensor and actuator may be any temperature responsive bimetal, bulb or similar device which produces movement of the rod connected thereto in response to temperature changes.

BRIEF DESCRIPTION OF THE DRAWINGS

The FIGURE is a side view, partially in cross section, of the dual in-line valve of this invention.

DESCRIPTION OF THE PREFERRED EMBODIMENT

The dual in-line valve of this invention is particularly adapted to maintain a desired temperature resulting from the mixing of two air streams of different temperatures, although any fluid may be used. As an example, in an environmental control system for aircraft, engine bleed air is used for cooling various aircraft compartments, but the temperature of the air supplied to different compartments may vary. The passenger compartment, for example, may be maintained at 72° F. (22° C.), while the compartment housing the avionics equipment is maintained at a much lower temperature. Typically some of the engine bleed air is cooled via heat exchange with cooler ram or ambient air in a heat exchanger.

For purposes of description, it will be assumed that one of the two air streams, the cooler of the two, is fed from a remote heat exchanger via a conduit 10, and that the warmer air, which may be ram air which has bypassed the heat exchanger, is fed via a conduit 12 concentric with conduit 10. Both conduits are contained within a heat exchanger or bulkhead 14 to which the dual in-line valve 16 is attached such as by bolts 17 in an annular flange 18 at one end thereof. A seal 20 may be used to prevent leakage between the valve 16 and the bulkhead 14.

The valve 16 contains an annular passage 22 in communication with conduit 12, while conduit 10 extends beyond the bulkhead 14 into the valve 16. As an alternative, the conduit 10 could be terminated at the end of the bulkhead 14 and a separate passage collinear with conduit 10 be contained in valve 16. Conduit 10 terminates at a poppet 24, the poppet being attached to one end of a rod 26, the other end of the rod 26 being attached to a temperature sensor-actuator 28. The temperature sensor-actuator 28, which may be a bimetallic element, a wax-filled bulb, a gas-filled bulb, or a simple temperature sensing device to which is connected a separate actuator element responsive to the temperature sensing device, moves the rod 26 and poppet 24 in an axial direction whereby the poppet 24 will close the conduit 10 at one position, or permit fluid flow therethrough when the poppet 24 is not in contact with the end of conduit 10. Poppet 24 is shown in its closed position.

Attached near the end of conduit 10 is an annular valve seat 30 upon which the poppet rests in its closed position to prevent flow through conduit 10. The upstream end of valve seat 30 is flanged, and connected to the flanged portion of the valve seat is an annular guide member 32 which extends downstream and provides a separation between annular passage 22 and a passage 34. The downstream end of guide member 32 is supported by a plurality of radially extending struts 38 attached to outer housing 36.

Attached to rod 26 and movable therewith are a second plurality of radially extending struts 40, to the outer end of which is attached an annular sleeve 42. Sleeve 42 abuts guide member 32, and is translatable relative thereto. Movement of rod 26 axially downstream will move sleeve 42 to abut the convergent portion 43 of housing 36 and close off passage 22, while at the same time opening poppet 24. The dotted lines show the position of sleeve 42 and poppet 24 when rod 26 is moved fully downstream, closing passage 22 and opening passage 34. Intermediate positions of sleeve 42 and poppet 24 will cause both passages 22 and 34 to be partially open.

The temperature sensor-actuator 28 is held in place by an annular flanged member 44 and a plurality of struts 46 radially extending therefrom and terminating in an annular ring 48, the ring 48 being wedged between the downstream end of housing 36 and the flanged upstream end of an annular housing 50 joined to housing 36 by threads 52.

In operation, flow enters valve 16 from conduits 10 and 12. In the position shown, flow from conduit 10 is shut off by poppet 24 being in contact with seat 30. Flow from conduit 12 passes through passage 22 in a relatively unrestricted manner, past struts 38 and through the fully open sleeve valve formed by sleeve 42, then flowing over the sensing element-actuator 28. When the temperature of the fluid stream falls below the desired temperature set by temperature sensor-actuator 28, the rod 26 is moved in a downstream direction, simultaneously moving the poppet 24 to open conduit 10 and permit flow through passage 34, and moving sleeve 42 to close off passage 22 and reduce flow therethrough. The movement continues until the temperature of the mixture equals the set temperature of temperature sensor-actuator 28. In their maximum downstream position, sleeve 42 and poppet 24 are in the position shown by the dotted lines, fully opening the poppet valve and fully closing the slide valve, permitting flow only from conduit 10 through passage 34.

The valve construction provides a simple dual valve which results in minimum pressure loss in each fluid flow path. The flow of both streams is modulated to achieve the desired mixture temperature. When either valve is fully open, a minimum flow restriction results.

Any available material such as metals or some plastics may be used in the construction of the valve, the primary criterion being strength, durability, cost and temperature response. In addition, if the two fluids are at significantly different pressures, it may be necessary to modify the relative dimensions of the conduits, passages and valve elements to maintain an appropriate relative flow between the two streams.

While the invention has been described with respect to its preferred embodiment, it is apparent that modifications and changes can be made to the construction and arrangement of components without departing from the scope of the invention as hereinafter claimed.

I claim:

1. A dual valve for modulating the flow of two fluid streams of different temperatures to produce a desired mixture temperature of said two streams comprising:

a first conduit containing a first pressurized fluid;

an annular housing surrounding said first conduit and forming therebetween a second conduit containing a second pressurized fluid at a temperature different from said first fluid;

an annular guide member connected at one end to the outside of said first conduit and continuing in a downstream direction and forming a first annular passage between said guide member and said housing adapted to pass said second fluid, the downstream end of said guide member extending axially and terminating a distance downstream from the downstream end of said first conduit;

said annular housing having a reduced diameter portion downstream of the downstream end of said guide member whereby an axially extending opening is formed between the downstream end of said guide member and the reduced diameter portion of said annular housing; said opening being adapted to pass therethrough said second fluid;

a second annular passage defined by the inside of said annular guide member and adapted to pass said first fluid upon its exit from said first conduit, said first fluid being mixed with the second fluid adjacent said opening;

a temperature sensor located within said housing downstream from said opening and responsive to the temperature of the fluid in said housing, said temperature sensor including actuator means movable in an axial direction in response to changes in the temperature of the fluid sensed by said temperature sensor;

a rod connected at one end to said actuator means and extending axially upstream therefrom, the other end of said rod having attached thereto a poppet adapted to seat against the downstream end of said first conduit and modulate flow of said first fluid therethrough;

and an annular sleeve member attached to and radially spaced from said rod, the outer periphery of said sleeve member abutting the axially extending downstream end of said guide member, translation of said rod in response to said actuator means to its limit in the upstream direction causing said poppet to seat upon the end of said first conduit thereby stopping fluid flow therethrough and simultaneously moving said sleeve member upstream from said opening and adjacent said guide member, and translation of said rod to its limit in the downstream direction causing said sleeve member to seat upon the reduced diameter portion of said housing thereby covering said opening and stopping fluid flow therethrough and simultaneously moving said poppet away from the end of said first conduit, said rod being adapted to be moved by said actuator means to any position intermediate its upstream and downstream limits whereby each of said fluid streams is modulated inversely with respect to the other to regulate the temperature of the fluid sensed by said temperature sensor.

2. A valve as in claim 1 in which said temperature sensor is a bimetallic thermometer.

3. A valve as in claim 1 in which said temperature sensor is a deformation thermometer.

* * * * *